US011941036B2

(12) United States Patent
Nguyen et al.

(10) Patent No.: US 11,941,036 B2
(45) Date of Patent: Mar. 26, 2024

(54) METHODS AND ARRANGEMENTS FOR SIMILARITY SEARCH BASED ON MULTI-LABEL TEXT CLASSIFICATION

(71) Applicant: Capital One Services, LLC, McLean, VA (US)

(72) Inventors: Brian Nguyen, Chantilly, VA (US); Paul Cho, Boston, MA (US); Ankur Ankur, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/831,651

(22) Filed: Jun. 3, 2022

(65) Prior Publication Data
US 2023/0394075 A1 Dec. 7, 2023

(51) Int. Cl.
*G06F 16/30* (2019.01)
*G06F 16/33* (2019.01)
*G06F 16/35* (2019.01)

(52) U.S. Cl.
CPC .......... *G06F 16/35* (2019.01); *G06F 16/3347* (2019.01)

(58) Field of Classification Search
CPC .................................................. G06F 16/3347
See application file for complete search history.

(56) References Cited

U.S. PATENT DOCUMENTS

| 2019/0130308 A1* | 5/2019 | Chickering | ............ G06N 20/00 |
| 2019/0378028 A1* | 12/2019 | Chaudhuri | ............ G06N 5/048 |
| 2020/0356851 A1* | 11/2020 | Li | ............ G06F 16/93 |

* cited by examiner

*Primary Examiner* — Mahesh H Dwivedi
(74) *Attorney, Agent, or Firm* — KDW Firm PLLC

(57) ABSTRACT

Logic may provide a hierarchical label structure for a document with a predicted set of hierarchical labels. Logic may provide a historical label performance database comprising performance data associated with each assignee in a complete set of assignees for each label in a complete set of the hierarchical labels. Logic may generate a first vector for the hierarchical label structure for the document. Logic may generate a second vector for the assignees in an identified set of assignees, comprising each hierarchical label in the predicted set of hierarchical labels for the document, the identified set comprising one or more of the assignees in the complete set of assignees. Logic may perform a similarity search to identify a predicted assignee from the identified set of assignees and logic may predict a selected assignee of the identified set of assignees to associate with the document via the similarity search.

19 Claims, 7 Drawing Sheets

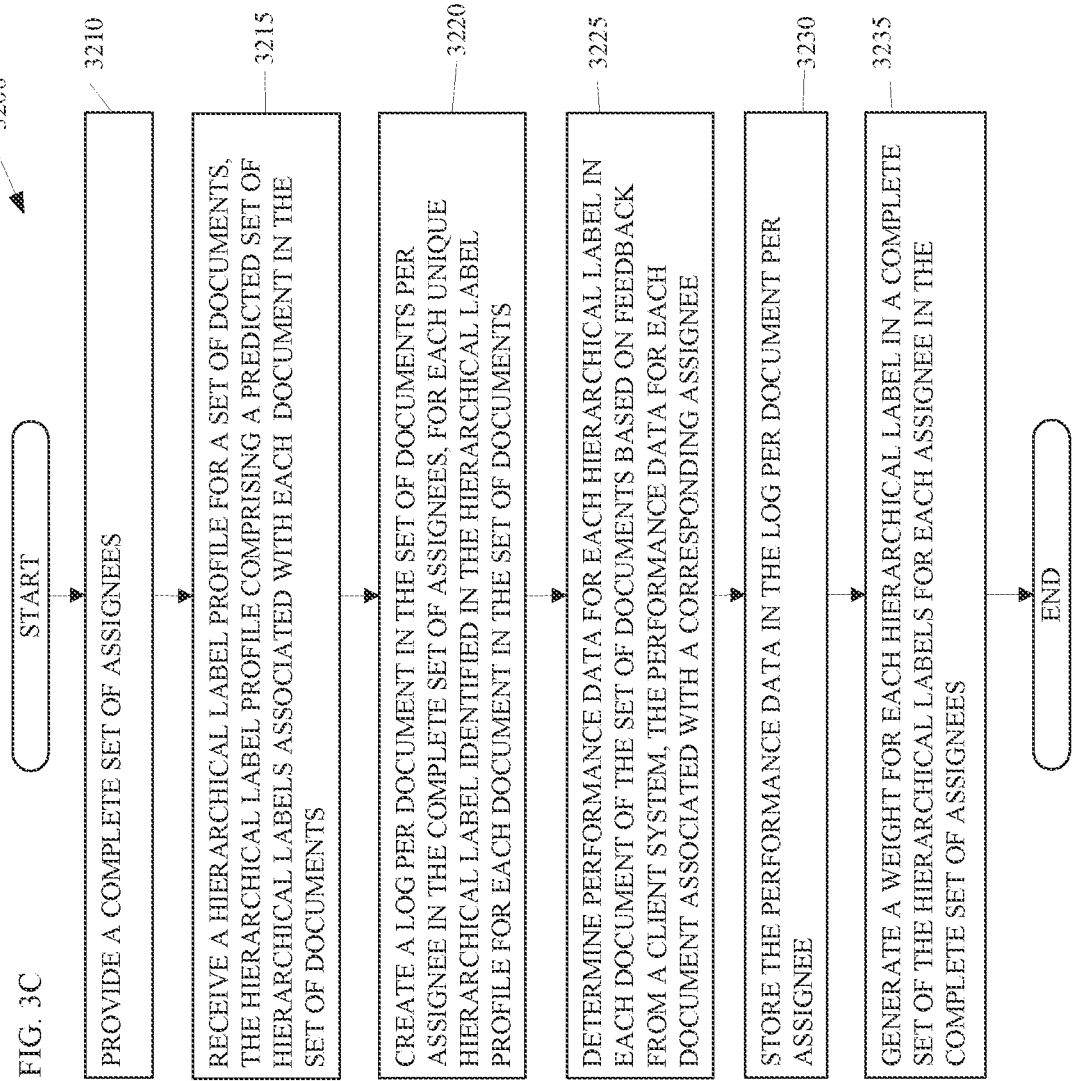

METHODS AND ARRANGEMENTS FOR SIMILARITY SEARCH BASED ON MULTI-LABEL TEXT CLASSIFICATION

TECHNICAL FIELD

Embodiments described herein are in the field of predictive assignment. More particularly, the embodiments relate to methods and arrangements to predict an assignee with a similarity search based on multi-label text classification and performance feedback.

BACKGROUND

Various service-oriented organizations have mechanisms for assigning documents to assignees for resolution. For instance, retailers, manufacturers, credit card companies, information technology groups, software services, Internet access providers, and the like typically accept descriptions of issues from customers or questions at a central location and assign technical support staff to respond.

Some organizations request that the customer assign a group by selecting a group that should handle the request from a pull-down menu. Other organizations may just assign the group based on tiers of experience. For instance, upon receipt of an issue of request for support, an organization may assign the ticket number to a document that includes a description of an issue from a customer. The ticket may be assigned to a tier one response group that may resolve, e.g., 80 percent of the issues received by the organization. If the tier one group is unable to resolve the ticket, the ticket may be assigned to a tier two group, and so on until the customer reaches the correct group of assignees that can satisfactorily resolve the issue, or the customer is no longer able to wait on the phone or for a response via email to resolve the issue and the customer resolves the issue in another way.

Such an iterative process can, in some instances, cause a negative impression related to the overall communication, which is neither helpful nor conducive to ongoing communications between the organization and the customers.

SUMMARY

Embodiments may include various types of subject matter such as methods, apparatuses, systems, storage media, and/or the like. One embodiment may include a system comprising: memory; and logic circuitry coupled with the memory. In some embodiments, the logic circuitry may provide a hierarchical label structure for a document, the hierarchical label structure comprising a predicted set of hierarchical labels associated with the document. The logic circuitry may provide a historical label performance database, the historical label performance database comprising performance data associated with each assignee in a complete set of assignees for each label in a complete set of the hierarchical labels. The logic circuitry may generate a first vector for the hierarchical label structure for the document. The logic circuitry may generate a second vector for each of the assignees in an identified set of assignees, the second vector comprising each hierarchical label in the predicted set of hierarchical labels of the hierarchical label structure for the document, the identified set comprising one or more of the assignees in the complete set of assignees. The logic circuitry may also perform a similarity search to identify a predicted assignee from the identified set of assignees and the logic circuitry may predict a selected assignee of the identified set of assignees to associate with the document via the similarity search.

Another embodiment may comprise a non-transitory storage medium containing instructions, which when executed by a processor, cause the processor to perform operations. The operations may receive a hierarchical label profile for a document, the hierarchical label profile comprising a predicted set of hierarchical labels associated with the document. The operations may access a historical label performance database, the historical label performance database comprising performance data associated with each assignee in a complete set of assignees for each label in a complete set of the hierarchical labels. The operations may generate, based on the access of the historical label performance database, a first vector for the hierarchical label profile for the document. The operations may generate, based on the access of the historical label performance database, a second vector for each of the assignees in an identified set of assignees, having the predicted set of hierarchical labels of the hierarchical label profile for the document. The operations may correlate the first vector with the second vector for each of the assignees in the identified set of assignees. And the operations may determine a selected assignee of the identified set of assignees to associate with the document based on correlation the first vector with the second vector for each of the assignees in the identified set of assignees.

Yet another embodiment may comprise a system. The system may comprise memory and logic circuitry coupled with the memory. The logic circuitry may provide a complete set of assignees. The logic circuitry may receive a hierarchical label profile for a set of documents, the hierarchical label profile comprising a predicted set of hierarchical labels associated with each document in the set of documents. The logic circuitry may, for each document in the set of documents, create a log entry in a database for a document, the log entry comprising unique hierarchical labels identified in the hierarchical label profile for the document; determine performance data for each hierarchical label in the log entry in the database based on feedback from a client system, the performance data for the log entry associated with at least one assignee of the complete set of assignees; and store the performance data associated the document and the at least one assignee associated with the performance data in the log entry. And the logic circuitry may generate a weight for each hierarchical label in a complete set of the hierarchical labels for each assignee in the complete set of assignees, wherein at least one of the assignees is associated with the performance data for more than one of the documents in the complete set of documents.

BRIEF DESCRIPTION OF THE DRAWINGS

FIGS. 3A-C depict flowcharts of embodiments to predict assignees, by assignment logic circuitry, such as the assignment logic circuitry shown in FIGS. 1A, 1B, 2A, and 2B;

DETAILED DESCRIPTION OF EMBODIMENTS

Figure 1B:
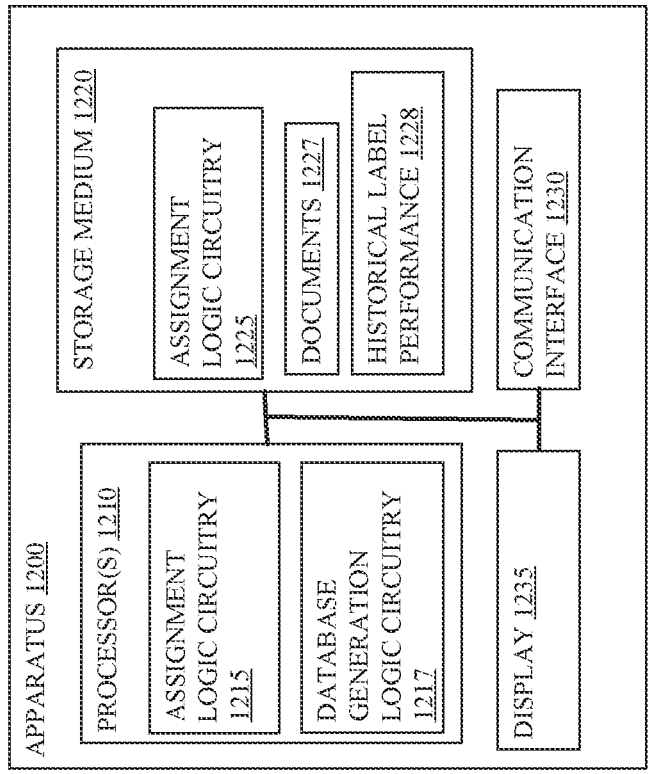
FIG. 1B depicts embodiments of an apparatus and assignment logic circuitry, such as the server(s) 1010 and models illustrated in FIG. 1A.

The following is a detailed description of embodiments depicted in the drawings. The detailed description covers all modifications, equivalents, and alternatives falling within the appended claims.

Embodiments discussed herein can generally improve assignment of assignees to a document to resolve an issue associated with the document in an efficient and effective manner. Some embodiments may improve current systems with assignment logic circuitry by, e.g., predicting a selected assignee from an identified set of assignees based on hierarchical labels associated with the document and performance data associated with the assignees. In some embodiments, the identified set of assignees may include a complete set of assignees in an organization or a subset of the complete set of assignees such as all available assignees, all assignees with bandwidth in their queues, and/or the like. For example, some embodiments may be implemented on a tier-by-tier basis to improve the tiered system of selecting assignees. In other words, such embodiments may determine (or predict) a selected assignee from an identified set of first tier assignees, then determine a selected assignee from an identified set of second tier assignees if not resolved by a selected first tier assignee, then determine a selected assignee from an identified set of third tier assignees if not resolved by the second-tier assignee, and so on. In such embodiments, the identified set of assignees may reside within a tier such as first tier for an initial response to an issue. In other embodiments, the assignment logic circuitry may replace current systems by selecting all potential assignees for the identified set of assignees and determining a selected assignee based on the performance data associated with all potential assignees.

In some embodiments, the assignment logic circuitry may receive a text document from the documents that indicates an action to take or problem to solve such as a patent application to examine, a call center transcript to resolve, an email requesting a response, and/or the like. The assignment logic circuitry may pre-process the document to remove or replace non-alphanumeric characters, and then to tokenize and stem the text of the document prior to text vectorization. Tokenization may involve representation of the words, characters, and/or subwords (n-grams) as tokens (numeric representations of the words, characters and/or subwords).

The assignment logic circuitry may perform stemming to group inflected forms of a word so the inflected forms of the word may be analyzed as a single item, or stem. Other embodiments may include further pre-processing of the documents. In some embodiments, pre-processing of the document may use non-text items in the document. For instance, the pre-processing may use graphical items or symbols, audio clips, and/or other non-text items that can be converted to text, character representations, or a vectorized text for input into the HMTC model.

Text vectorization is the process of converting text into numerical representations. Text vectorization may include natural language processing with one or more processes such as Binary Term Frequency; Bag of Words (BoW) Term Frequency (TF); (L1) Normalized Term Frequency (L1 TDF); (L2) Normalized Term Frequency-Inverse document frequency (L2 TF-IDF); and word-to-vector (Word2Vec). Binary Term Frequency captures presence (1) or absence (0) of term in document. Bag of Words (BoW) Term Frequency captures frequency of term in document. (L1) Normalized Term Frequency captures normalized BoW term frequency in document. (L2) Normalized TFIDF captures normalized TFIDF in document.

After the assignment logic circuitry pre-processes the document, the assignment logic circuitry may include a hierarchical multi-label text classification (HMTC) model operating in inference mode to process the vectorized text (and optionally vectors representing other graphical items, symbols, audio clips, or other) of the document to predict a set of hierarchical labels associated with the document. Hierarchical multi-label classification is a complex classification task where the classes involved in the problem are hierarchically structured and each document may simultaneously belong to more than one class in each hierarchical level. In some embodiments, the HMTC model may be trained incrementally via each level in a hierarchy for labels to predict hierarchical labels. When operated in inference mode, the HMTC model may output the prediction of a set of hierarchical labels associated with the document based on the vectorized text input for the document.

To illustrate, a customer ticket may discuss a disputed charge and the potential for the disputed charge being a fraudulent charge. The assignment logic circuitry may pre-process and vectorize the text of the customer ticket to place the document in a form that can be processed by the HMTC model. The HMTC model may comprise a neutral network such as a recurrent neural network, a deep neural network, and/or the like. In inference mode, the HMTC model may, based on the vectorized text of the document, predict hierarchical labels associated with the customer ticket such as: (credit card→transactions→transaction charge dispute)+ (credit card→account settings→card freeze). In some embodiments, the predicted set of hierarchical labels may be in the form of tokens or text. In some embodiments, the HMTC model may output labels in the form of vectors of words as shown. In some embodiments, the HMTC model may output the predicted hierarchical labels as a list of vectors of words such as: (credit card, transactions, transaction charge dispute); (credit card, account settings, card freeze).

The predicted set of hierarchical labels may include one or more hierarchical labels depending on the content of the document processed by the HMTC model. In some embodiments, the number and combinations of labels that form the predicted hierarchical labels for various documents are determined by the training of the HMTC model and are fixed while the HMTC model is operated in inference mode. In such embodiments, the complete set of hierarchical labels is known while the HMTC model operates in inference mode.

After the HMTC model generates the predicted set of hierarchical labels, the assignment logic circuitry may comprise a correlator model to predict an assignee to select to efficiently and effectively handle actions responsive to receipt of the document. In other words, the correlator model may predict an assignee that should be selected based on historical performance data associated with the assignee for hierarchical labels identified in the predicted set of hierarchical labels.

In some embodiments, the assignment logic circuitry may provide the correlator model with the output of the HMTC model in the form of a first vector and with historical label performance data from a database in the form of a set of second vectors. The set of second vectors may include a vector for each assignee in the historical label database (a complete set of assignees) or a vector for each assignee in a subset of the complete set of assignees from the historical label database. For example, some organizations may identify a set of assignees currently on call, which periodically transitions based on the geographical location of the assignees at different times of day. As a result, the identified set of assignees may differ depending on the time of day that a client or customer submits a document for resolution.

Other embodiments may determine an identified set of assignees based on the amount of work sitting in a queue for the assignees. For instance, the identified set of assignees may include assignees or groups of assignees with work queues that are less than 80 percent full, 90 percent full, 100 percent full, or the like. Still other embodiments may identify a set of assignees having performance data in the historical label database for at least one of the hierarchical labels in the predicted set of hierarchical labels.

The first vector, for instance, may include the hierarchical labels predicted for the document by the HMTC model with one or more weights assigned to each of the predicted hierarchical labels. In some embodiments, the assignment logic circuitry may assign a weight of one to each of the hierarchical labels. In other embodiments, the assignment logic circuitry may assign a weight between zero and one to each of the hierarchical labels. In still other embodiments, the assignment logic circuitry may assign a weight greater than one to each of the hierarchical labels. In some embodiments, for instance, all weights for the first and second vectors may represent a percentage between zero and 100 percent.

The assignment logic circuitry may generate the set of second vectors from the historical label database. The historical label database may include historical log entries for documents received and resolved along with identification of the assignee(s) that resolved the document and performance data associated with the resolution of the documents.

The performance data may include one or more indicators related to the resolution as well as values indicative of a performance level between, e.g., poor and excellent. In one embodiment, the performance data may include a value of one or a zero for each hierarchical label identified in the historical label performance database. For example, in response to a successful completion or resolution of a document, the assignee may receive a performance of a one for each label in the predicted set of hierarchical labels for the document. If the assignee did not complete or resolve the document for any reason, the assignee may receive a zero for each of the hierarchical labels predicted for the document. Other embodiments may include multiple performance factors for each hierarchical label in the database. Furthermore, some embodiments may include a "not applicable" indicator (or an "x" indicator or the like) for an assignee that begins work on a document but does not complete the work for the document for any reason other than, e.g., a poor performance evaluation. Other embodiments may assign a performance data value of zero to each of the hierarchical labels in a complete set of hierarchical labels for an assignee for hierarchical labels in the complete set that are not also represented in a predicted set of hierarchical labels for a document.

The assignment logic circuitry may generate the set of second vectors by creating a vector for each assignee that provides an indication of successful completion or resolution of documents with similar sets of hierarchical labels or for all documents in log entries of a historical label performance database. For example, the weights for each hierarchical label in the second vector may represent a percentage of successful completions or resolutions of that hierarchical label. The percentage may include a total number of successful resolutions for documents associated with the particular hierarchical label divided by the total number of documents resolved with the particular hierarchical label. In other embodiments, the percentage may include a sum of performance data values for successful resolutions for documents associated with the particular hierarchical label divided by the total number of documents resolved with the particular hierarchical label. Note that embodiments contemplate other calculations for summarizing performance data values for each of the hierarchical labels.

For embodiments that include more than one factors related to performance, each hierarchical label may include more than one performance data values that can be treated as weights in the second vector for the hierarchical label. In some of these embodiments, a single weight may be calculated for each hierarchical label based on performance data values for the multiple performance factors. For instance, multiple performance factors in the performance data may include a performance factor for friendliness, satisfaction of resolution, professionalism, etc. In such embodiments, an equal weight might be applied to each of these factors so the weight for the hierarchical labels may include a sum of the performance data values for the multiple performance factors divided by the total number of performance factors and divided by the total number of completed documents associated with the particular hierarchical label.

In some embodiments, the first vector and the second vector may include a complete set of hierarchical labels and, in such embodiments, the first vector may include weights of zero for hierarchical labels that are not included in the predicted set of hierarchical labels and may include weights of one for hierarchical labels that are included in the predicted set of hierarchical labels for the document. Furthermore, such embodiments may include the complete set of hierarchical labels in the set of second vectors that include weights that summarize the performance data values of a complete set of hierarchical labels for the corresponding assignees.

Based on the first vector and the set of second vectors, the correlator model may predict which assignee has the most favorable performance data for the predicted set of hierarchical labels for the documents received. In some embodiments, the assignment logic circuitry may implement a cosine similarity between the first vector and each of the second vectors to determine cosine similarity scores for each of the second vectors and then compare or sort the scores to identify the score closest to, e.g., one, wherein one indicates second vectors pointed in the same direction as the first vector and zero indicates second vectors at a 90-degree angle (perpendicular) to the first vector. In such embodiments, for cases in which two or more of the similarity scores of the second vectors are equal, the correlator model may select one assignee at random from the assignees with the equal similarity values or select one of the assignees with the equal similarity values based on other selection factors. For instance, selection factors may include the workload of the assignees (e.g., workload represented in a queue), the amount of experience of the assignees (e.g., total number of documents resolved), a predetermined order of priority associated with each of the assignees, a round robin process for resolution of equivalent similarities, and/or the like. An equation for the cosine similarity is:

$$\text{Cosine Similarity}(x,y) = (x*y)/\|x\|\|y\|$$

Wherein x and y are vectors such as $(x_1, x_2, x_3, \ldots x_n)$ and $(y_1, y_2, y_3, \ldots y_n)$ where $x_n$ is the weight Nth hierarchical label and $y_n$ is the weight Nth hierarchical label respectively, x*y is the dot product of the vectors, $\|x\|$ is the Euclidean norm of the vector x, and $\|y\|$ is the Euclidean norm of the vector y. The Euclidean norm of the vector x is defined as the square root of $(x_1^2+x_2^2+x_3^2+\ldots x_n^2)$, wherein n=the number of hierarchical labels in the vector and $x_n$ is the weight Nth hierarchical label.

In other embodiments, the assignment logic circuitry may provide other values as input to a correlator model such as a tuple of labels in a text, token, or vectorized text format with at least one tuple for each of the assignees in the identified set of assignees, a binary matrix of indicating the presence or absence of a hierarchical label, and/or the like. For example, the correlator model may comprise a machine learning model such as a statistical model or a neural network and may receive the input in the form of, e.g., a matrix or multiple vectors for each of the assignees in the set of identified assignees. The matrix may include, e.g., a row per document for an assignee. The correlator model may output a prediction of the closest correlation of performance data by an assignee based on the predicted set of hierarchical labels from the HMTC model. Some embodiments may implement models such as decision trees, random forests, nearest neighbor, and Naive Bayes.

Further embodiments may learn based on client or organizational feedback to the assignment logic circuitry of performance data for completion of activities related to a document. For instance, the feedback may comprise single factor or multi-factor performance data about successfully completing a task associated with the document, completing the task to the satisfaction of a customer or client, completing a task or set of tasks within one or more specified timeframes, receiving a high customer satisfaction rating, and/or the like. A database generation logic circuitry may add the performance data and indications of the predicted hierarchical labels in a log entry for the corresponding document in the historical label performance database. For instance, the database generation logic circuitry may add a log entry for the document, add the performance data values to each hierarchical label in the predicted set of hierarchical labels associated with the document and, in some embodiments, include an "non-applicable" indication, an "x" indication, or indication of, e.g., 0, for other hierarchical labels of the complete set of hierarchical labels in the log entry. In other embodiments, the historical label performance database may only include indications for the predicted hierarchical labels and the corresponding performance data in the log entry.

In some embodiments, the database generation logic circuitry may generate the historical label performance database as a background operation to populate the database with a threshold level of log entries prior to operating the correlator model to predict assignees.

In other embodiments, the historical label performance database may be built prior to training the correlator model. The correlator model may be trained based on a first portion of the log entries in the historical label performance database and the training may be validated with a second portion of the log entries in the historical label performance database. Furthermore, the correlator model may continue training after deployment through feedback including performance data for completion of document tasks by an assignee.

Several embodiments comprise systems with multiple processor cores such as central servers, modems, routers, switches, servers, workstations, netbooks, mobile devices (Laptop, Smart Phone, Tablet, and the like), and the like. In various embodiments, these systems relate to specific applications such as healthcare, home, commercial office and retail, security, industrial automation and monitoring applications, financial services, and the like.

Figure 1A:
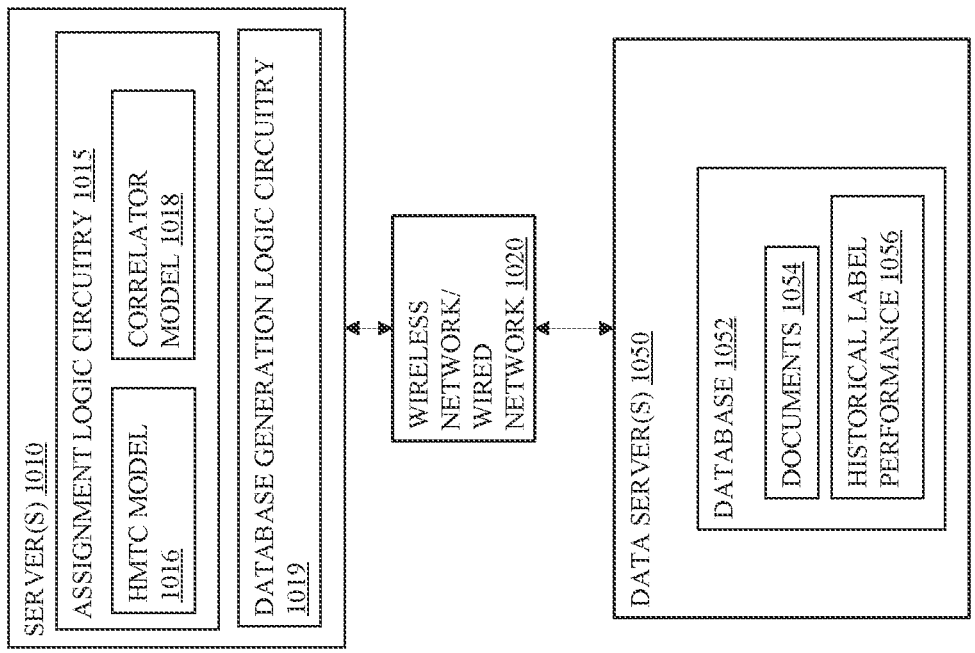
FIG. 1A depicts embodiments of systems including servers, networks, data servers, and software applications to predict assignees.

Turning now to the drawings, FIGS. 1A-B depict embodiments of systems including servers, networks, data servers, and word processing applications to predict assignees. FIG. 1A illustrates an embodiment of a system 1000. The system 1000 may represent a portion of at least one wireless or wired network 1020 that interconnects server(s) 1010 with data server(s) 1050. The at least one wireless or wired network 1020 may represent any type of network or communications medium that can interconnect the server(s) 1010 and the data server(s) 1050, such as a cellular service, a cellular data service, satellite service, other wireless communication networks, fiber optic services, other land-based services, and/or the like, along with supporting equipment such as hubs, routers, switches, amplifiers, and/or the like.

In the present embodiment, the server(s) 1010 may represent one or more servers owned and/or operated by a company that provides services. In some embodiments, the server(s) 1010 represent more than one company that provides services provided via assignment logic circuitry 1015. For example, a first set of one or more server(s) 1010 may provide services including a hierarchical multi-label classification model 1016 to generate a hierarchical label structure (or profile) for a document. The hierarchical label structure may comprise a predicted set of hierarchical labels associated with the document. The assignment logic circuitry 1015 may pre-process the document to remove or replace non-alphanumeric characters, and then to tokenize and stem the text of the document prior to text vectorization. Tokenization may involve representation of the words, characters, and/or subwords (n-grams) as tokens (numeric representations of the words, characters and/or subwords). Stemming may group inflected forms of a word so the inflected forms of the word may be analyzed as a single stem. Text vectorization may process the pre-processed document to convert text in the document into numerical representations. Then, while operating in inference mode, the HMTC model may output the prediction of a set of hierarchical labels associated with the document based on the vectorized text input for the document.

A second set of one or more server(s) 1010 may include a correlator model 1018 to correlate the predicted set of hierarchical labels output from the HMTC model 1016 with hierarchical labels of documents in a historical label performance database 1056 to identify the most similar document(s) and the assignee(s) associated with the best performance data for completion of tasks related to the document.

A third set of one or more server(s) 1010 may include a database generation logic circuitry 1019 to create or update a historical label performance database 1056 to identify the assignee(s) associated with the best performance data for completion of tasks related to the hierarchical labels identified in the predicted set of hierarchical labels for a document.

The HMTC model 1016 and the correlator model 1018 may represent operating instances of the models and, in many embodiments, more than one instances of one or both of the HMTC model 1016 and the correlator model 1018 may operate concurrently. The HMTC model 1016 and the correlator model 1018 may comprise algorithms or machine learning models such as statistical models, neural networks, or other machine learning models. In many embodiments, instances of the HMTC model 1016 and the correlator model 1018 may operate independently although, in some embodiments, instances of the correlator model 1018 may begin processing for a particular document after the HMTC model 1016 creates a predicted set of hierarchical labels for the particular document.

The methodology of the HMTC model 1016 and the correlator model 1018 may depend on the implementation. The methodology of the models may refer to the model type such as a linear model, a non-linear model, a recurrent model, and/or a deep learning model.

In the present embodiment, the HMTC model 1016 and the correlator model 1018 methodologies may be independent of one another. The assignment logic circuitry 1015 may convert the output of the HMTC model 1016 into a format for input into the correlator model 1018 such as a first vector and may store the output from an instance of the HMTC model 1016 in a working queue for one or more of the instances of the correlator model 1018. In several embodiments, the assignment logic circuitry 1015 may also gather the corresponding data from the historical label performance database 1056, convert the data from the historical label performance database 1056 into a format for input into an instance of the correlator model 1018, and store the converted data from the historical label performance database 1056 in the working queue with an association indicative of the corresponding output from the HMTC model 1016. For example, the instance of the HMTC model 1016 may output a predicted set of hierarchical labels and the assignment logic circuitry 1015 may convert the predicted set of hierarchical labels into a first vector that includes a set of weights associated with each of the hierarchical labels in the predicted set of hierarchical labels. Thereafter, the assignment logic circuitry 1015 may store the first vector in a transition queue or in a working queue. The transition queue may, for instance, maintain the first vector until the corresponding set of second vectors is ready to store in the working queue since both vectors are required for the correlator model 1018 to operate.

In some embodiments, the assignment logic circuitry 1015 may create the first vector by assigning a weight of one to each of the hierarchical labels in the predicted set of hierarchical labels and creating a vector in the form of a tuple including weights and the complete set of hierarchical labels. In some embodiments, the weight of one may represent 100 percent. In some embodiments, the first vector may include a weight of zero for hierarchical labels that are in the complete set but not included in the predicted set of hierarchical labels for the document. In other embodiments, the first vector may include a weight of one for hierarchical labels that are in the complete set but not included in the predicted set of hierarchical labels for the document and the weight of zero for hierarchical labels that are included in the predicted set of hierarchical labels for the document. In still other embodiments, the first vector may include weights that indicate hierarchical labels that are in the complete set but not included in the predicted set of hierarchical labels for the document such as a phrase "not applicable", a character "x", and/or the like. In such embodiments, the correlator model 1018 may include a mechanism or may be trained to process the first and second vectors with weights that indicate hierarchical labels that are in the complete set but not included in the predicted set. For instance, the correlator model 1018 may not use or may otherwise ignore the hierarchical labels that are not included in the predicted set of hierarchical labels for the document.

The assignment logic circuitry 1015 may also, in parallel with, before, or after generation of the first vector, generate a set of second vectors for input to an instance of the correlator model 1018. In some embodiments, the assignment logic circuitry 1015 may determine a summary value for the performance data values for each hierarchical label associated with an assignee. For example, the assignment logic circuitry 1015 may generate a sum of the performance data values for each hierarchical label and divide the sum by the number of non-zero performance data log entries for each hierarchical label or by the total number of log entries that indicate inclusion of the hierarchical label in the predicted set for the document. To illustrate, for a hierarchical label 1, the performance data value associated with hierarchical label 1 is summed for all log entries associated with the assignee 1. Then the sum is divided by the total number of log entries associated with the assignee 1 excluding (minus) the number of log entries associated with the assignee that indicate that hierarchical label 1 is not part of the predicted set of hierarchical labels for the corresponding document. In other embodiments, the sum is divided by the total number of log entries associated with the assignee that have a non-zero performance data value.

In some embodiments, the assignment logic circuitry 1015 may generate and/or maintain a set of second vectors (one for each assignee in the historical label performance database 1056) created based on the log entries in the historical label performance database 1056. In such embodiments, a second vector for an assignee may include a complete set of the hierarchical labels from the historical label performance database 1056 as well as performance summaries for each of the hierarchical labels in the complete set of the hierarchical labels. In some of these embodiments, one or more of second vectors or the set of second vectors may become invalid in response to receipt of new performance data for a new document received by the database generation logic circuitry 1019. After the database generation logic circuitry 1019 includes the new log entry for a new document, the summarized data for the assignee associated with the new log entry can be updated in the set of second vectors to revalidate the performance summary values for hierarchical labels associated with the corresponding assignee.

Prior to implementation of the assignment logic circuitry 1015, the database generation logic circuitry 1019 may build the historical label performance database 1056 in the database 1052 of the data server(s) 1050. The database generation logic circuitry 1019 may receive feedback from clients or customers that are internal or external to the organization of the assignees. The feedback may, in some embodiments, include a single performance data value in relation to performing tasks related to processing a document. In some embodiments, the performance data value may include a binary selection of a zero or a one. The zero may indicate no performance such as an indication that the tasks associated with the document have not been completed. The performance data value of one may indicate that the performance of the tasks associated with the document are complete. In other embodiments, the performance data value may include a value between zero and one, wherein the zero indicates that the tasks have not been completed, and values from greater than zero through one indicate a range of performance evaluations from poor to excellent.

In some embodiments, the system 1000 may store documents 1054 such as customer tickets or other text documents for resolution in the database 1052 of the data server(s) 1050 to await resolution. The system 1000 may store the documents 1054 until tasks associated with the documents are resolved or completed and, in further embodiments, the documents 1054 may be maintained in the database 1052 for some period after tasks associated with the documents 1054 are completed.

Prior to initiating the correlator model 1018, the database 1052 may capture documents 1054 for preparing a set of documents for training and a set of documents for validation of the correlation model 1018. In some embodiments, the documents 1054 may include an original ticket as well as a pre-processed version of one or more of the documents and a text vectorized version of the one or more of the documents. In further embodiments, the database 1052 may store the original documents 1054 received for processing.

FIG. 1B depicts embodiments of an apparatus 1200 and assignment logic circuitry 1215 and 1225 and database logic circuitry 1217, such as the server(s) 1010 and models illustrated in FIG. 1A. The apparatus 1200 may be a computer in the form of a smart phone, a tablet, a notebook, a desktop computer, a workstation, or a server. The apparatus 1200 can combine with any suitable embodiment of the systems, devices, and methods disclosed herein. The apparatus 1200 can include processor(s) 1210, a non-transitory storage medium 1220, communication interface 1230, and a display device 1235. The processor(s) 1210 may comprise one or more processors, such as a programmable processor (e.g., a central processing unit (CPU)). The processor(s) 1210 may comprise processing circuitry to implement assignment logic circuitry 1215 such as the assignment logic circuitry 1015 in FIG. 1A.

The processor(s) 1210 may operatively couple with a non-transitory storage medium 1220. The non-transitory storage medium 1220 may store logic, code, and/or program instructions executable by the processor(s) 1210 for performing one or more instructions including the assignment logic circuitry 1225. The non-transitory storage medium 1220 may comprise one or more memory units (e.g., removable media or external storage such as a secure digital (SD) card, random-access memory (RAM), a flash drive, a hard drive, and/or the like). The memory units of the non-transitory storage medium 1220 can store logic, code and/or program instructions executable by the processor(s) 1210 to perform any suitable embodiment of the methods described herein. For example, the processor(s) 1210 may execute instructions such as instructions of the assignment logic circuitry 1225 causing one or more processors of the processor(s) 1210 represented by the assignment logic circuitry 1215 to predict an assignee for processing a document from a customer or client and stored in the documents 1227 in the storage medium 1220.

The assignment logic circuitry 1215 may analyze a document from the documents 1227 via an HMTC model such as the HMTC model 1016 in FIG. 1A to predict a set of hierarchical labels associated with the document, convert the output of the HMTC model into a first vector for input into a correlator model such as the correlator model 1018 shown in FIG. 1A to predict an assignee to select for performing tasks associated with the document. The assignment logic circuitry 1215 may also access the historical label performance database 1228 to determine a second vector for log entries in the historical label performance database 1228. Each second vector may include a subset of or a complete set of hierarchical labels that can be predicted by the HMTC model in relation to documents and weights for each of the hierarchical labels in the second vector may comprise an overall performance value associated with an assignee for each of the hierarchical labels. In some embodiments, the second vector may comprise a list of weights in a tuple in a predetermined order. In some embodiments, the list of weights may be associated with indications of the hierarchical labels associated with the weights. For instance, the indications of the hierarchical labels may comprise offsets or an order number, or another number associated with the location of the hierarchical label within a predefined ordering of the complete set of hierarchical labels.

With the first vector and the set of second vectors representing performance data for each of the potential assignees in an identified set of assignees, the correlator model of the assignment logic circuitry may correlate the first vector with each of the second vectors to determine a correlation score. The correlation score for each vector will be based on the correlation of the weights for the hierarchical labels in the predicted set of labels identified by the HMTC model. For example, assuming that one represents 100% and zero represents 0% or not completed, the weights of one associated with the predicted hierarchical labels in the first vector may represent 100% so the closest correlation for the second vectors would include a second vector that has a 100% performance data value for each of the predicted hierarchical labels.

After correlating the first vector with each second vector in the set of second vectors, the assignment logic circuitry 1215 may predict or determine an assignee to assign to the tasks associated with the document by selecting the assignee associated with the second vector that has the highest correlation with the first vector such as the second vector that has the highest correlation value. For instance, the highest correlation value might be calculated via a cosine similarity between the first vector and the second vector.

The database generation logic circuitry 1217 may perform functionality similar to the database generation logic circuitry 1019 in FIG. 1A. In many embodiments, the database generation logic circuitry 1217 may add indications of the predicted hierarchical labels in a log entry for a document in the historical label performance database 1228. In several embodiments, the database generation logic circuitry 1217 may add performance data associated with an assignee that processed the document. For instance, the database generation logic circuitry 1217 may add a log entry for a new document on receipt of the new document, add indications of each hierarchical label in the predicted set of hierarchical labels associated with the new document, and add performance data values for each of the hierarchical labels associated with the new document based on feedback about the assignee that performed one or more tasks to resolve the new document. In some embodiments, the database generation logic circuitry 1217 may generate the historical label performance database 1228 to populate the database with a threshold level of log entries prior to predicting assignees based on the content of the historical label performance database 1228. In further embodiments, the database generation logic circuitry 1217 may generate a threshold number of log entries for an assignee prior to predicting performance of the assignee via the historical label performance database 1228.

The non-transitory storage medium 1220 may store code and data for the assignment logic circuitry 1225, store documents 1227, and store a historical label performance database 1228 such as the documents 1227 received for resolution from customers or clients and historical label performance data related to resolution of one or more tasks related to the one or more of the documents 1227. In many embodiments, the documents 1227 include textual descriptions of one or more issues experienced by a client or customer. In some embodiments, memory units of the non-transitory storage medium 1220 may store data related to the customers associated with the assignment logic circuitry 1225 such as error rates and historical changes in group associations of each of the customers.

The processor(s) 1210 may couple to a communication interface 1230 to transmit and/or receive data such as client or customer feedback for a document such as performance data from one or more external devices (e.g., a terminal, display device, a smart phone, a tablet, a server, a printer, or other remote device). The communication interface 1230 includes circuitry to transmit and receive communications through a wired and/or wireless media such as an Ethernet interface, a wireless fidelity (Wi-Fi) interface, a cellular data interface, and/or the like. In some embodiments, the communication interface 1230 may implement logic such as code in a baseband processor to interact with a physical layer device to transmit and receive wireless communications such as a document from a client or customer to the assignment logic circuitry 1215. For example, the communication interface 1230 may implement one or more local area networks (LAN), wide area networks (WAN), infrared, radio, Wi-Fi, point-to-point (P2P) networks, telecommunication networks, cloud communication, and the like.

Figure 2:
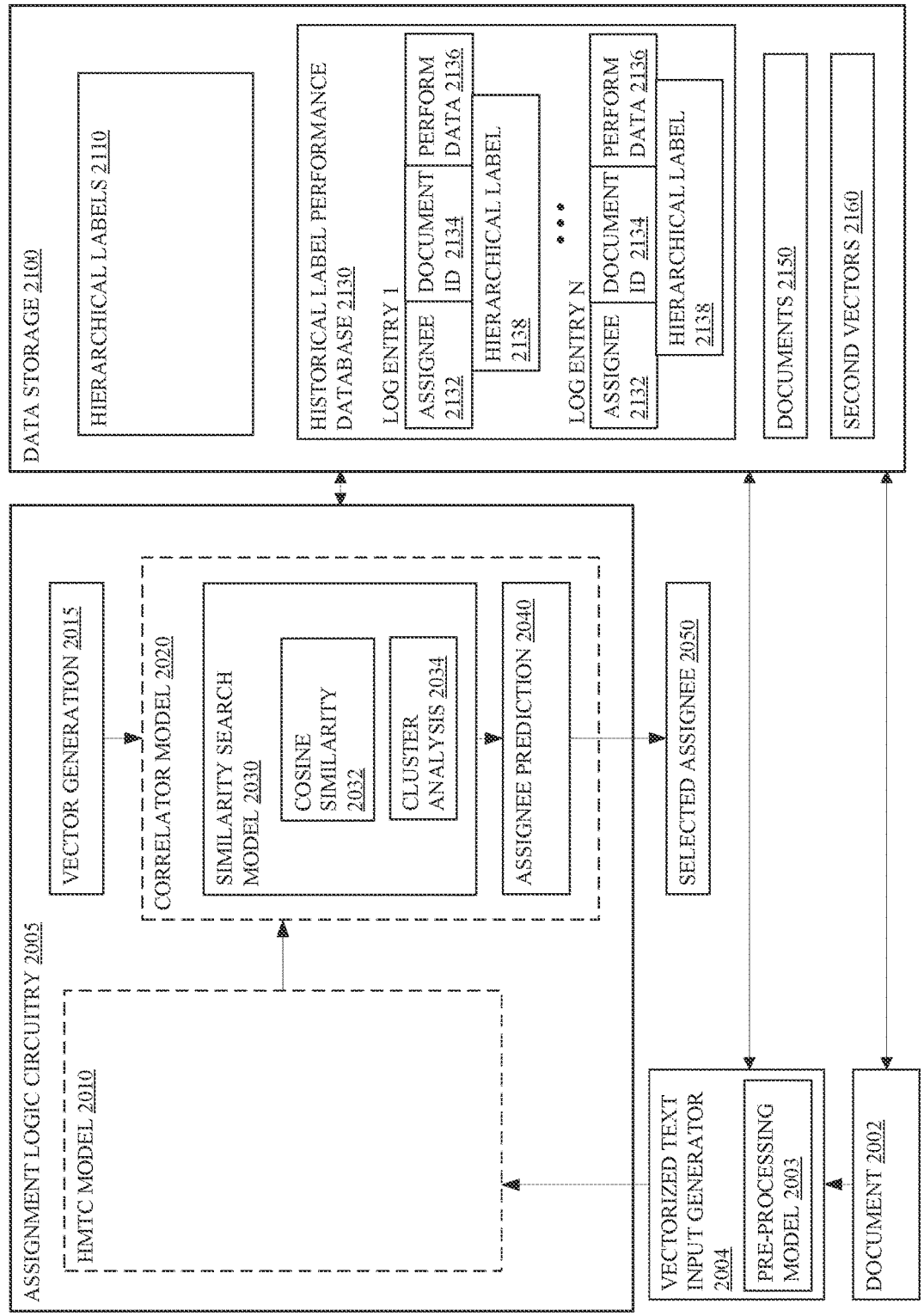
FIG. 2 depicts embodiments of logic circuitry including a database and a data storage to predict assignees with models, such as the logic circuitry and models illustrated in FIG. 1A.

FIG. 2 depicts embodiments of a system 2000 including assignment logic circuitry 2005 and data storage 2100 to predict assignees with models, such as the assignment logic circuitry 1015, the HMTC model 1016, and the correlator model 1018 illustrated in FIG. 1A. The system 2000 may also comprise a vectorized text input generator 2004 to vectorize text of documents 2002 prior to provision of the document 2002 to the input of the HMTC model 2010. The document 2002 may comprise a call center transcript, a customer ticket, a patent application, a blog article, and/or the like that is received with the expectation of performance of one or more tasks related to the content of the document 2002. For instance, the call center transcript may include information provided by a customer that describes one or more issues related to provision of a service. The call center transcript may be generated based on a conversation with a first-tier support staff that was unable to address the one or more issues. In response to the unaddressed issues, the call transcript is forwarded to the system 2000 as the document 2002. In some embodiments, a copy of the call transcript is included in data storage 2100 in the documents 2150.

The system 2000 may include a vectorized text input generator 2004 to generate vectorized text in a format for input into the HMTC model 2010. The vectorized text input generator 2004 may include a pre-processing model 2003 to pre-process the document 2002 as needed prior to vectorizing the text. The pre-processing model 2003 may remove non-text items and replace them within word tokens, tokenize the text of the document 2002, and stem the document 2002 as needed. Stemming may associate inflections of a word with a stem. For instance, during the call transcript, the customer may refer to a credit card as a "card", a "credit card", a "charge card", a "Visa", and/or the like and stemming may associate all these different references to the card with the same item.

After pre-processing the document 2002, the vectorized text input generator 2004 may vectorize the text of the document and create an input for the HMTC model 2010. In some embodiments, the vectorized text of the document 2002 may also be stored in the documents 2150.

The HMTC model 2010 may process the document 2002 to generate a predicted set of hierarchical labels based on the training of the HMTC model 2010. The predicted set of hierarchical labels may include two or more labels, each describing a hierarchy of subject matter included in the document 2002. For example, the call transcript may include a description by a customer of a potentially fraudulent charge on a credit card. The customer may indicate that the credit card is still in the possession of the customer, that the credit card account should be frozen until the disputed charge is resolved and that the customer wants to add an alert to the account to notify the customer if a charge greater than 10 USD is made of the account. An example of a predicted set of labels includes:

Fraud→transactions→credit card→charge→Card not present→dispute→fraudulent

Fraud→transactions→credit card→charge→Card not present→dispute→card not lost

Credit card→account settings→alert settings→charge limit notification

Protective actions→credit card→account settings→card freeze

In many embodiments, the hierarchical labels are defined to provide depth to understanding the content of the document 2002 that can, advantageously, provide insight into selection of a selected assignee 2050 such a call center representative to handle tasks related to the subject matter in the document 2002 for the customer. After generating the predicted set of hierarchical labels, the predicted set of hierarchical labels may be output from the HMTC model 2010 to the correlator model 2020 for processing.

In some embodiments, the data storage 2100 may maintain a complete set of hierarchical labels 2110 available for prediction of the set of hierarchical labels by the HMTC model 2010. In other embodiments, the hierarchical labels 2110 may maintain a complete set of hierarchical labels output by the HMTC model 2010.

In some embodiments, the assignment logic circuitry 2005 may comprise a vector generation logic circuitry 2015 to convert the output from the HMTC model to a first vector and to generate or obtain a set of second vectors 2160 for input to the correlator model 2020. The first vector may include an indication of the hierarchical labels included in the predicted set as well as establish weights for the hierarchical labels. In some embodiments, the weights may be set to one for all the hierarchical labels included in the predicted set. In other embodiments, the assignment logic circuitry 2005 may include a predetermined set of weights to each of the hierarchical labels. For example, certain subject matter in the hierarchical labels may require specific access authorizations such as actions related to fraudulent charges. In some embodiments, the assignment logic circuitry 2005 may assign more weight to the hierarchical labels including subject matter related to fraud than other subject matter. As an illustration, each hierarchical label related to fraud may be assigned a weight of one and other hierarchical labels may be assigned a weight of one half. In other embodiments, the weights may comprise numbers of one or greater.

In other embodiments, certain subject matter may identify a specific group of call center specialists and such embodiments may limit the potential assignees to an identified set of assignees associated with fraudulent charges. In still other embodiments, the inclusion of subject matter in the hierarchical labels related to fraud may predict a set of assignees in the complete set of assignees that have historical experience addressing issues related to fraud.

The vector generation logic circuitry 2015 may generate a set of second vectors based on data in the historical label performance database 2130 or obtain a set of second vectors 2160 previously generated and stored in the second vectors in the data storage 2100. For instance, some embodiments may realize an efficiency improvement by storing the content of the second vectors 2160 in the data storage 2100 and updating the second vectors 2160 periodically or updating second vectors in the data storage 2100 as the summaries of performance data become invalid. In such embodiments, the assignment logic circuitry 2005 may individually mark an identified second vector in the second vectors 2160 as invalid if a new document is added to the historical label performance database 2130 associated with the identified second vector. In some embodiments, the assignment logic circuitry 2005 may wait until the identified second vector is input to the correlator model 2020 to update the identified second vector. In some embodiments, the assignment logic circuitry 2005 may update the identified second vector when documents being processed by the correlator model 2020 decreases due to decreases in demand for processing documents.

The historical label performance database 2130 may comprise log entries 1 through N, wherein N is any integer greater than one and may be a count of the number of documents 2150 maintained in the historical label database 2130 such as a count of the number of documents 2150 processed, processed for training, and/or processed for evaluation. Each log entry may include an assignee field 2132, a document identifier (ID) field 2134, one or more performance data fields 2136, and one or more hierarchical label fields 2138. The assignee field 2132 may include a value or an indication for the assignee that processed the document for the log entry. The document ID field 2134 may include a value or an indication to identify the document such as the location or offset for the document in the documents 2150. The one or more performance data field(s) 2136 may include one or more values or indications for performance factors associated with processing the document associated with the log entry. And the one or more hierarchical label fields 2138 may include one or more values or indications to identify the hierarchical labels associated with the one or more values or indications for performance factors.

The correlator model 2020 may include a similarity search model 2030 and an assignee prediction model 2040. The similarity search model 2030 may correlate each second vector with the first vector to determine which of the second vectors is the most similar to the first vector. Since each second vector is associated with the performance data values of an assignee, the assignee associated with the second vector that is most similar to the first vector is associated with the assignee that has the best historical record to process the document 2002. If more than one assignee has the same, best correlation value, other factors and/or processes may be used to select between the more than one assignee.

In the present embodiment, the similarity search model 2030 includes a cosine similarity model 2032 to perform a cosine similarity as a similarity search and a cluster analysis model 2034 to perform a cluster analysis as a similarity search. Other embodiments may implement other similarity search methodologies.

The cosine similarity model 2032 may determine the cosine of the angle between the first vector and the second vector. The cosine of the angle between two parallel vectors is one and the cosine of the angle between two perpendicular vectors is zero. So, the closer the value of the cosine similarity is to one, the more closely matched the vectors. The cosine similarity is calculated by determining the product of the first and second vectors divided by the product of the Euclidean norms of the first and second vectors. For instance, if the first vector (x) is (1, 1, 1, 1, 1) and the second vector (y) is (0.9, 0.9, 0.9, 0, 0), the cosine similarity= (1*0.9+1*0.9+1*0.9+, 1*0+1*0) divided by square root of $(1^2+1^2+1^2+1^2+1^2)$*square root of $(0.9^2+0.9^2+0.9^2+0^2+0^2)$= 2.7/(square root(5)*square root(2.43))=0.711.

The cosine similarity model 2032 may pass the values of the cosine similarity of the first vector with each of the second vectors to the assignee prediction 2040 to determine which of the assignees is predicted for selection to assign to the document 2002. If none of the other cosine similarities produce a result of greater than 0.711, then the assignee prediction 2040 may determine that the assignee associated with 0.711 may represent the is predicted for selection to assign to the document 2002.

The cluster analysis model 2034 may cluster the first vector and second vectors based on the labels in the hierarchical labels as well as performance data. In some embodiments, the cluster analysis model 2034 may cluster assignees with the experience most related to the predicted set of hierarchical labels and provide a value indicative of the similarity between the second vectors and the first vectors. The cluster analysis model 2034 may pass the values from the cluster analysis to the assignee prediction 2040 model to determine which of the assignees is predicted for selection to assign to the document 2002.

The assignee prediction 2040 model may predict the selected assignee 2050 based on the output of the similarity search model 2030. For instance, the correlator model 2020 may receive a predicted set of hierarchical labels associated with the new document 2002. The correlator model 2020 may perform a similarity search via the similarity search model 2030 to determine how a set of assignees performed when processing documents associated with similar or the same sets of hierarchical labels. The assignee prediction 2040 model may account for the output of the similarity search model 2030, which may include a list of one or more assignees and the performance data associated with the one or more assignees in relation to similar or the same sets of hierarchical labels as predicted for the new document 2002. In some embodiments, the assignee prediction 2040 model may account for other considerations such as the current workload of the one or more assignees, the work schedule for the one or more assignees, and/or the like. Based on the output of the similarity search model 2030 and optionally other factors, the assignee prediction 2040 model may identify or select a selected assignee 2050 to process the new document 2002.

Figure 3A:
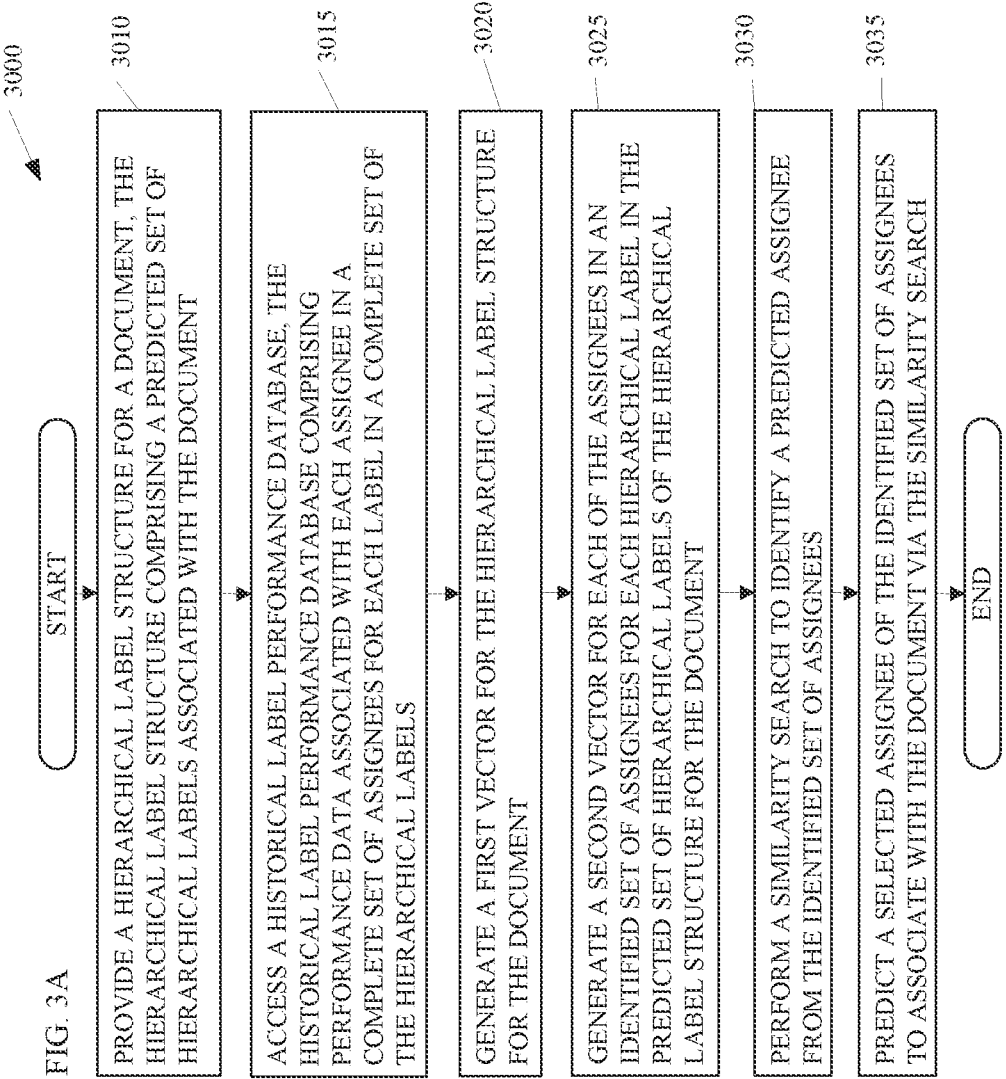
Figure 3B:
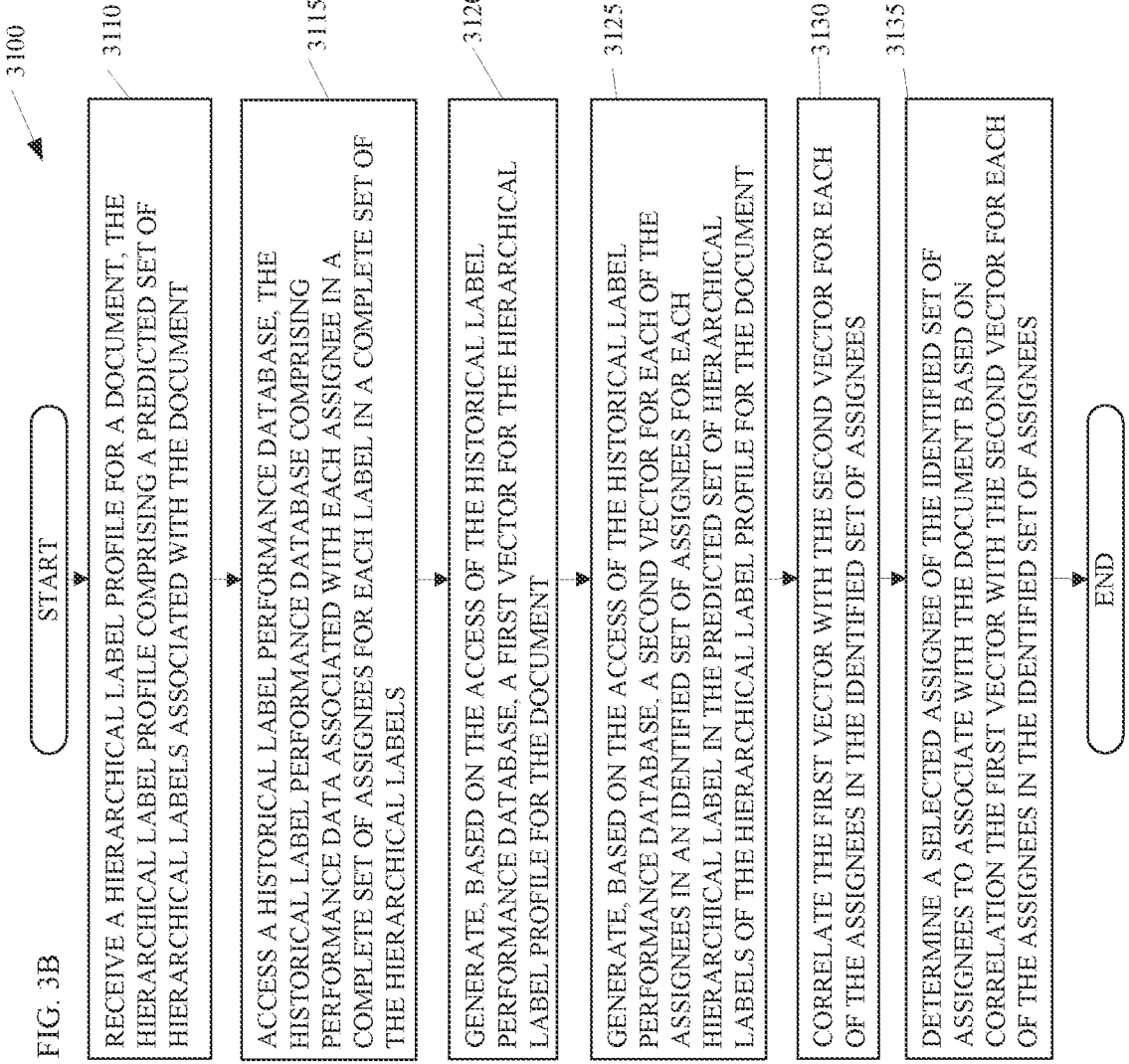

FIGS. 3A-C depict flowcharts of embodiments to predict assignees, by assignment logic circuitry, such as the assignment logic circuitry shown in FIGS. 1A, 1B, 2A, and 2B. FIG. 3A illustrates a flowchart of a process 3000 to adjust communications between customers. The process 3000 starts with provision of a hierarchical label structure for a document, the hierarchical label structure comprising a predicted set of hierarchical labels associated with the document (element 3010). For instance, the document may comprise text and the hierarchical label structure for the document may comprise predictions of hierarchical labels associated with the document based on the text. In some embodiments, the document may also comprise non-text items that are converted to text so the non-text items may be considered during the generation of the hierarchical labels.

The assignment logic circuitry may also access a historical label performance database, the historical label performance database comprising performance data associated with each assignee in a complete set of assignees for each label in a complete set of the hierarchical labels (element 3015). For instance, in some embodiments, the assignment logic circuitry may filter the complete set of assignees based on the performance data associated with the complete set of assignees to determine the identified set of assignees associated with at least one hierarchical label in the predicted set of hierarchical labels. In some embodiments, the assignment logic circuitry may generate a sort order for the identified set of assignees based on the performance data associated with each of the assignees based on the performance data associated with at least one of the hierarchical labels in the predicted set of hierarchical labels, wherein the identified set of assignees comprises the complete set of assignees or a filtered set of the assignees.

After receipt of the hierarchical labels and the historical label performance data for assignees, the assignment logic circuitry may generate a first vector for the hierarchical label structure for the document (element 3020). In some embodiments, the first vector may comprise the predicted set of hierarchical labels associated with the document, wherein each hierarchical label is assigned a weight of one.

The assignment logic circuitry may also generate a second vector for each of the assignees in an identified set of assignees, the second vector comprising each hierarchical label in the predicted set of hierarchical labels of the hierarchical label structure for the document, the identified set comprising one or more of the assignees in the complete set of assignees (element 3025). In some embodiments, the second vector may comprise a set of hierarchical labels associated with a first assignee of the complete set of assignees, wherein each hierarchical label is assigned a weight based on performance data of the first assignee corresponding to each hierarchical label. In some embodiments, the performance data may comprise a percentage or fraction related to performance of the first assignee for each hierarchical label in the complete set of the hierarchical labels for which the performance data was collected for the first assignee and zero or null for each hierarchical label for which no performance data was collected for the first assignee.

After receipt of the first vector and the set of second vectors, the assignment logic circuitry may perform a similarity search to identify a predicted assignee from the identified set of assignees (element 3030). In some embodiments, the performance of the similarity search may comprise calculating a cosine similarity for the first assignee with the first vector and a second vector in the set of second vectors.

Once the assignment logic circuitry performs the similarity search, the assignment logic circuitry may predict a selected assignee of the identified set of assignees to associate with the document via the similarity search (element 3035). The assignment logic circuitry may predict the selected assignee via selection of the first assignee-based comparison of cosine similarities of the identified set of assignees.

FIG. 3B illustrates a flowchart of a process 3100 to determine a selected assignee for processing a document. The process 3100 begins with receiving a hierarchical label profile for a document, the hierarchical label profile comprising a predicted set of hierarchical labels associated with the document (element 3110). In some embodiments, the document may comprise text and the hierarchical label profile for the document may comprise predictions of hierarchical labels associated with the document based on the text.

After receiving the hierarchical label profile for the document, the process 3100 may access a historical label performance database. The historical label performance database may comprise performance data associated with each assignee in an identified set of assignees for each label in an identified set of the hierarchical labels (element 3115). In some embodiments, the assignment logic circuitry may filter the complete set of assignees based on the performance data associated with a complete set of assignees to determine the identified set of assignees associated with at least one hierarchical label in the predicted set of hierarchical labels. In some embodiments, the assignment logic circuitry may generate a sort order for the identified set of assignees based on the performance data associated with each of the assignees and based on the performance data associated with at least one of the hierarchical labels in the predicted set of hierarchical labels for each of the assignees. In such embodiments, the identified set of assignees may comprise the complete set of assignees or a filtered set of the assignees.

After accessing the performance data associated with each of the assignees, the process 3100 may generate, based on the access of the historical label performance database, a first vector for the hierarchical label profile for the document (element 3120). In some embodiments, the first vector may comprise the predicted set of hierarchical labels associated with the document. Each hierarchical label may also be assigned a weight of one, zero, or other integer or fraction.

The assignment logic circuitry may also generate, based on the access of the historical label performance database, a set of second vectors including a second vector for each of the assignees in the identified set of assignees. Each of the second vectors may have the predicted set of hierarchical labels of the hierarchical label profile for the document (element 3125). In some embodiments, one of the second vectors is associated with a first assignee of the identified (or complete) set of assignees and may comprise a set of hierarchical labels associated with a first assignee. Each hierarchical label in the second vector associated with the first assignee may be assigned a weight based on performance data of the first assignee corresponding to each hierarchical label. Furthermore, the performance data of the first assignee may include a percentage or fraction related to performance of the first assignee for each hierarchical label in the complete set of the hierarchical labels for which the performance data was collected for the first assignee and zero or null for each hierarchical label for which no performance data was collected for the first assignee. In some embodiments, the assignment logic circuitry may generate corresponding second vectors for each of the assignees in the identified or filtered set of assignees. In further embodiments, the assignment logic circuitry may generate corresponding second vectors for each of the assignees in a complete set of assignees.

Once the first vector and the set of second vectors are generated, the assignment logic circuitry may correlate the first vector with the second vector for each of the assignees in the identified set of assignees (element 3130). In some embodiments, correlation of the first vector with the second vector for each of the assignees in the identified set of assignees may comprise calculating a cosine similarity with the first vector and the second vector for each of the assignees in the identified set of assignees. In some embodiments, correlation of the first vector with the second vector for each of the assignees in the identified set of assignees may comprise performing a cluster analysis of the assignees in the identified set of assignees based on the performance data in the historical label performance database.

The assignment logic circuitry may then determine a selected assignee of the identified set of assignees to associate with the document based on correlation the first vector with the second vector for each of the assignees in the identified set of assignees (element 3135). In some embodiments, prediction of the selected assignee may comprise selection of the first assignee based on comparison of cosine similarities of the identified set of assignees and the predicted set of hierarchical labels associated with the document.

FIG. 3C illustrates a flowchart of a process 3200 to generate a historical label performance database based on assignee performance. The process 3200 may provide a complete set of assignees (element 3210). The complete set of assignees may include all possible assignees that may be selected for assignment of a document for processing.

The process 3200 may also receive a hierarchical label profile for a set of documents (element 3215). The hierarchical label profile may comprise a predicted set of hierarchical labels associated with each document in the set of documents.

After receiving the hierarchical label profile for a set of documents, the database generation logic circuitry may, for each document in the set of documents, create a log entry in a database for a document (element 3220). The log entry may comprise unique hierarchical labels identified in the hierarchical label profile for the document.

The database generation logic circuitry may also, for each document in the set of documents, determine performance data for each hierarchical label in the log entry in the database based on feedback from a client system (element 3225). The performance data for the log entry may be associated with at least one assignee of the complete set of assignees.

The database generation logic circuitry may also, for each document in the set of documents, store the performance data associated with the document and the at least one assignee associated with the performance data in the log entry (element 3230).

After storing the performance data for each document in the set of documents, the database generation logic circuitry may generate a weight for each hierarchical label in a complete set of the hierarchical labels for each assignee in the complete set of assignees (element 3235). In some embodiments, at least one of the assignees is associated with the performance data for more than one of the documents in the complete set of documents.

Figure 4:
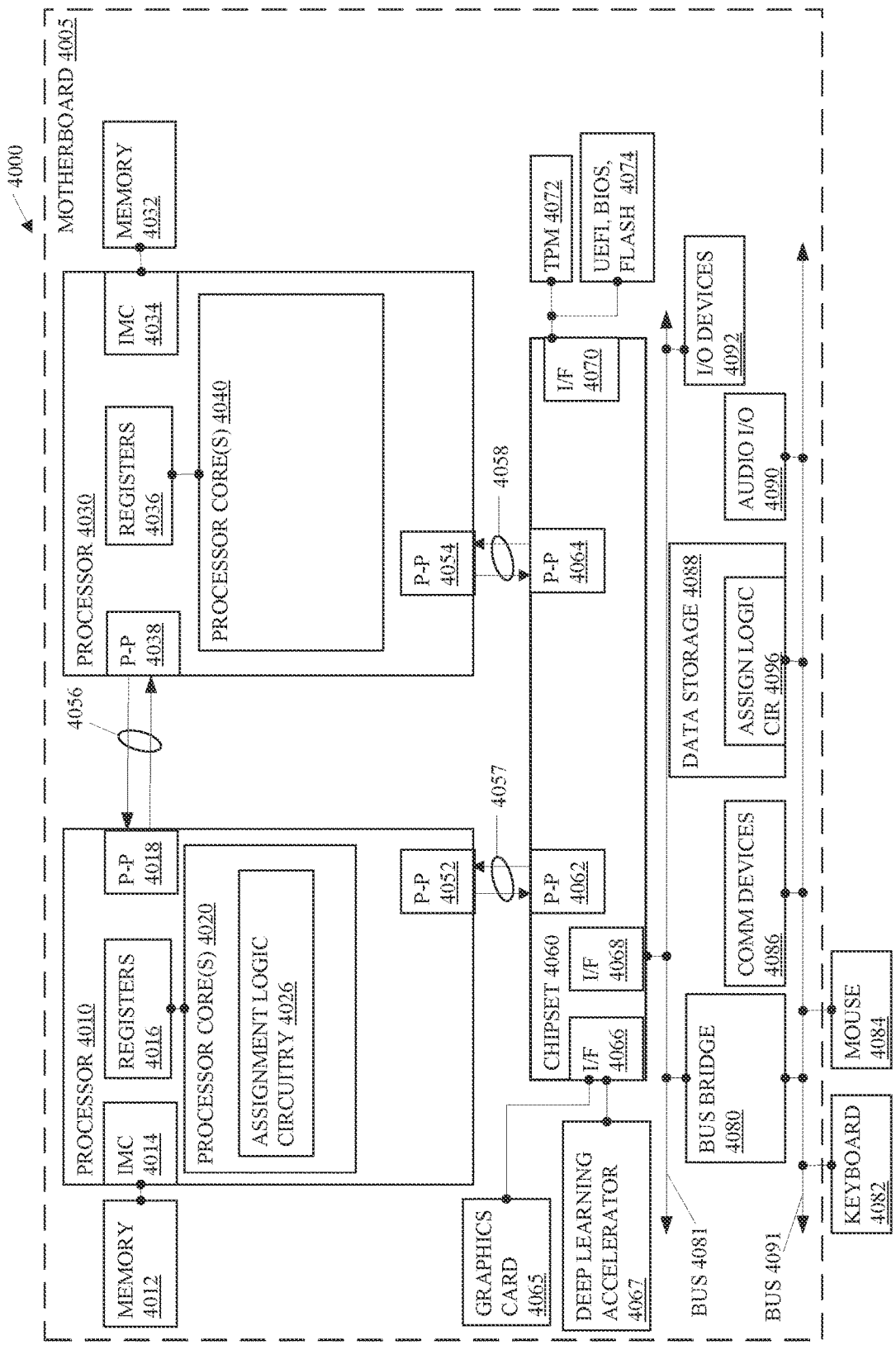
FIG. 4 depicts an embodiment of a system including a multiple-processor platform, a chipset, buses, and accessories such as the server and apparatus shown in FIGS. 1A and 2A-B.

FIG. 4 illustrates an embodiment of a system 4000 such as a server of the server(s) 1010 shown in FIG. 1A or the apparatus 1200 shown in FIG. 1B. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include an assignment logic circuitry 4026 such as the assignment logic circuitry 1015 shown in FIG. 1A. The assignment logic circuitry 4026 may represent circuitry configured to predict an assignee based on a document and based on performance data associated with the assignee within the processor core(s) 4020 or may represent a combination of the circuitry within a processor and a medium to store all or part of the functionality of the assignment logic circuitry 4026 in memory such as cache, the memory 4012, buffers, registers, and/or the like. In several embodiments, the functionality of the assignment logic circuitry 4026 resides in whole or in part as code in a memory such as the assignment logic circuitry 4096 in the data storage unit 4088 attached to the processor 4010 via a chipset 4060 such as the assignment logic circuitry 1215 and 1225 shown in FIG. 1B. The functionality of the assignment logic circuitry 4026 may also reside in whole or in part in memory such as the memory 4012 and/or a cache of the processor. Furthermore, the functionality of the assignment logic circuitry 4026 may also reside in whole or in part as circuitry within the processor 4010 and may perform operations, e.g., within registers or buffers such as the registers 4016 within the processor 4010, registers 4036 within the processor 4030, or within an instruction pipeline of the processor 4010 or the processor 4030.

In other embodiments, more than one of the processor 4010 and 4030 may comprise functionality of the assignment logic circuitry 4026 such as the processor 4030 and/or the processor within the deep learning accelerator 4067 coupled with the chipset 4060 via an interface (I/F) 4066. The OF 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (UF) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an OF 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an OF 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the assignment logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
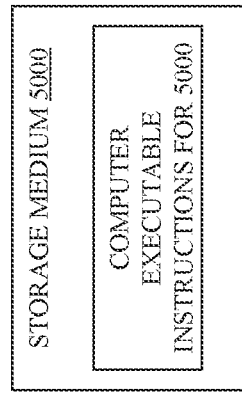
FIGS. 5-6 depict embodiments of a storage medium and a computing platform such as the server(s) shown in FIGS. 1A and 2A.

FIG. 5 illustrates an example of a storage medium 5000 to predict assignment of an assignee to process a document. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
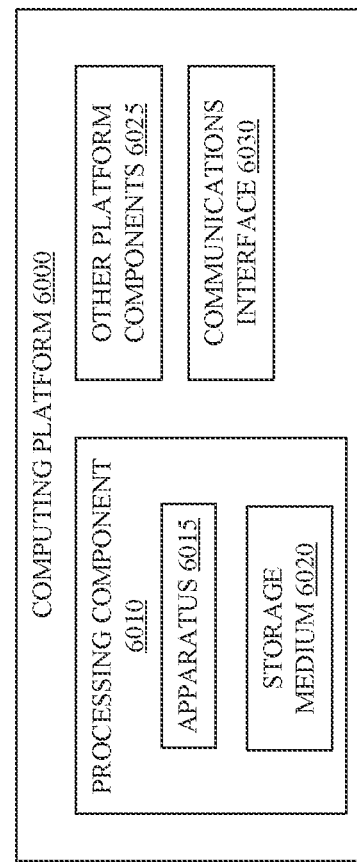

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the assignment logic circuitry 1015, 1215, and 1225 illustrated in FIGS. 1A and 1B, respectively. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function.

The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:

1. An apparatus comprising:
   memory; and
   logic circuitry coupled with the memory to:
      provide a hierarchical label structure for a document, the hierarchical label structure comprising a predicted set of hierarchical labels associated with the document;
      access a historical label performance database, the historical label performance database comprising performance data associated with each assignee in a complete set of assignees for each label in a complete set of the hierarchical labels;
      generate a first vector for the hierarchical label structure for the document;
      generate a second vector for each of the assignees in an identified set of assignees, the second vector comprising each hierarchical label in the predicted set of hierarchical labels of the hierarchical label structure for the document, the identified set comprising one or more of the assignees in the complete set of assignees;
perform a similarity search to identify a predicted assignee from the identified set of assignees; and
predict a selected assignee of the identified set of assignees to associate with the document via the similarity search.

2. The apparatus of claim 1, further comprising the logic circuitry to filter the complete set of assignees based on the performance data associated with the complete set of assignees to determine the identified set of assignees associated with at least one hierarchical label in the predicted set of hierarchical labels.

3. The apparatus of claim 1, further comprising the logic circuitry to generate a sort order for the identified set of assignees based on the performance data associated with each of the assignees based on the performance data associated with at least one of the hierarchical labels in the predicted set of hierarchical labels, wherein the identified set of assignees comprises the complete set of assignees or a filtered set of the assignees.

4. The apparatus of claim 1, the document comprising text, wherein the hierarchical label structure for the document comprises predictions of hierarchical labels associated with the document based on the text.

5. The apparatus of claim 1, the first vector comprising the predicted set of hierarchical labels associated with the document, wherein each hierarchical label is assigned a weight of one.

6. The apparatus of claim 5, the second vector comprising a set of hierarchical labels associated with a first assignee of the complete set of assignees, wherein each hierarchical label is assigned a weight based on performance data of the first assignee corresponding to each hierarchical label.

7. The apparatus of claim 6, the performance data to include a percentage or fraction related to performance of the first assignee for each hierarchical label in the complete set of the hierarchical labels for which the performance data was collected for the first assignee and zero or null for each hierarchical label for which no performance data was collected for the first assignee.

8. The apparatus of claim 7, wherein performance of the similarity search comprises calculation of a cosine similarity for the first assignee with the first vector and the second vector.

9. The apparatus of claim 7, wherein prediction of the selected assignee comprises selection of the first assignee based on comparison of cosine similarities of the identified set of assignees.

10. A non-transitory storage medium containing instructions, which when executed by a processor, cause the processor to perform operations, the operations to:
receive a hierarchical label profile for a document, the hierarchical label profile comprising a predicted set of hierarchical labels associated with the document;
access a historical label performance database, the historical label performance database comprising performance data associated with each assignee in an identified set of assignees for each label in an identified set of the hierarchical labels;
generate, based on the access of the historical label performance database, a first vector for the hierarchical label profile for the document;
generate, based on the access of the historical label performance database, a second vector for each of the assignees in the identified set of assignees, having the predicted set of hierarchical labels of the hierarchical label profile for the document;
correlate the first vector with the second vector for each of the assignees in the identified set of assignees; and
determine a selected assignee of the identified set of assignees to associate with the document based on correlation the first vector with the second vector for each of the assignees in the identified set of assignees.

11. The non-transitory storage medium of claim 10, wherein the operations further comprise operations to filter a complete set of assignees based on the performance data associated with the complete set of assignees to determine the identified set of assignees associated with at least one hierarchical label in the predicted set of hierarchical labels.

12. The non-transitory storage medium of claim 10, wherein the operations further comprise operations to generate a sort order for the identified set of assignees based on the performance data associated with each of the assignees based on the performance data associated with at least one of the hierarchical labels in the predicted set of hierarchical labels, wherein the identified set of assignees comprises a complete set of assignees or a filtered set of the assignees.

13. The non-transitory storage medium of claim 10, the document comprising text, wherein the hierarchical label profile for the document comprises predictions of hierarchical labels associated with the document based on the text.

14. The non-transitory storage medium of claim 10, the first vector comprising the predicted set of hierarchical labels associated with the document, wherein each hierarchical label is assigned a weight of one.

15. The non-transitory storage medium of claim 14, the second vector comprising a set of hierarchical labels associated with a first assignee of the set of assignees, wherein each hierarchical label is assigned a weight based on performance data of the first assignee corresponding to each hierarchical label.

16. The non-transitory storage medium of claim 15, the performance data to include a percentage or fraction related to performance of the first assignee for each hierarchical label in the set of the hierarchical labels for which the performance data was collected for the first assignee and zero or null for each hierarchical label for which no performance data was collected for the first assignee.

17. The non-transitory storage medium of claim 16, wherein correlation of the first vector with the second vector for each of the assignees in the identified set of assignees comprises calculating a cosine similarity for the first assignee with the first vector and the second vector for each of the assignees in the identified set of assignees.

18. The non-transitory storage medium of claim 16, wherein correlation of the first vector with the second vector for each of the assignees in the identified set of assignees comprises performing a cluster analysis of the assignees in the identified set of assignees based on the performance data in the historical label performance database.

19. The non-transitory storage medium of claim 16, wherein prediction of the selected assignee comprises selection of the first assignee based on comparison of cosine similarities of the identified set of assignees and the predicted set of hierarchical labels associated with the document.

* * * * *